US010663671B2

(12) United States Patent
Li et al.

(10) Patent No.: US 10,663,671 B2
(45) Date of Patent: May 26, 2020

(54) INTEGRATED FIBER-FERRULE, FIBER OPTIC ASSEMBLY INCORPORATING SAME, AND FABRICATION METHOD

(71) Applicant: Corning Research & Development Corporation, Corning, NY (US)

(72) Inventors: Ming-Jun Li, Horseheads, NY (US); Qi Wu, Painted Post, NY (US)

(73) Assignee: Corning Research & Development Corporation, Corning, NY (US)

( * ) Notice: Subject to any disclaimer, the term of this patent is extended or adjusted under 35 U.S.C. 154(b) by 0 days.

(21) Appl. No.: 16/143,645

(22) Filed: Sep. 27, 2018

(65) Prior Publication Data

US 2019/0101702 A1    Apr. 4, 2019

Related U.S. Application Data

(60) Provisional application No. 62/565,164, filed on Sep. 29, 2017.

(51) Int. Cl.
*G02B 6/38* (2006.01)
*G02B 6/02* (2006.01)
*G02B 6/255* (2006.01)

(52) U.S. Cl.
CPC ......... *G02B 6/381* (2013.01); *G02B 6/02052* (2013.01); *G02B 6/3834* (2013.01); *G02B 6/3846* (2013.01); *G02B 6/2551* (2013.01)

(58) Field of Classification Search
CPC .. G02B 6/381; G02B 6/02052; G02B 6/2551; G02B 6/3834
USPC .......................................................... 385/72
See application file for complete search history.

(56) References Cited

U.S. PATENT DOCUMENTS

| 5,241,615 A * | 8/1993 | Amos ............... C03B 37/01413 |
| | | 385/126 |
| 6,259,830 B1 * | 7/2001 | Bhagavatula ......... C03B 37/026 |
| | | 385/11 |
| 6,435,731 B1 | 8/2002 | Yamaguchi et al. |
| 6,742,936 B1 | 6/2004 | Knecht et al. |
| 8,132,971 B2 | 3/2012 | Luther et al. |

(Continued)

OTHER PUBLICATIONS

Ando; "Statistical Analysis of Insertion-Loss Improvement for Optical Connectors Using the Orientation Method for Fiber-Core Offset"; IEEE Photonics Technology Letters, vol. 3, No. 10; Oct. 1991; pp. 939-941.

(Continued)

*Primary Examiner* — Jerry M Blevins
(74) *Attorney, Agent, or Firm* — Grant A. Gildehaus

(57) ABSTRACT

An integrated fiber-ferrule useable as an optical coupling element includes a core directly contacting a cladding layer that has a lower index of refraction than that of the core, without an intervening adhesive. The cladding layer outer diameter is at least 100 times greater than that of the core, and matches an outer diameter of a standard ferrule. The integrated fiber-ferrule may be produced by drawing a glass preform into a cane, cutting the cane into sections, and shaping end faces of the cut sections (e.g., using a laser). To form a fiber optic assembly, a front end of an optical fiber core may be fusion spliced to a rear end of the core of the integrated fiber-ferrule. Use of an integrated fiber-ferrule permits reduction of core to fiber eccentricity, and reduction of connector insertion losses.

21 Claims, 12 Drawing Sheets

(56) References Cited

U.S. PATENT DOCUMENTS

| | | | |
|---|---|---|---|
| 9,016,953 B2 | 4/2015 | Ott et al. | |
| 9,144,917 B1 | 9/2015 | Gregorski | |
| 2003/0180026 A1* | 9/2003 | Spannagel | G02B 6/2551 385/140 |
| 2010/0329604 A1* | 12/2010 | Kojima | G02B 6/2852 385/31 |
| 2014/0199027 A1* | 7/2014 | Miller | G02B 6/3854 385/72 |
| 2019/0089114 A1* | 3/2019 | Hidaka | G02B 6/02 |

OTHER PUBLICATIONS

IEC 61300-3-34, Examinations and Measurements—Attenuation of Random Mated Connectors; Second Edition; (2001) 8 Pages.

IEC 61753-3-1, Fibre Optic Interconnecting Devices and Passive Components Performance Standard—Part 1: General and Guidance for Performance Standards. Mar. 2007; 9 Pages.

Li et al; "Optical Fiber Design for Field Mountable Conectors"; Journal of Lightwave Technology; vol. 18; No. 3; Mar. 2000; pp. 314-319.

Shahid et al; "Small and Efficient Connector System," Proc 49th Electronic Components and Technology Conf, San Diego, CA, pp. 375-380, 1999.

Sugita et al; "SC-Type Single-Mode Optical Fiber Connectors"; Journal of Lightwave Technology, vol. 7, No. 11, Nov. 1989; pp. 1689-1696.

\* cited by examiner

INTEGRATED FIBER-FERRULE, FIBER OPTIC ASSEMBLY INCORPORATING SAME, AND FABRICATION METHOD

CROSS-REFERENCE TO RELATED APPLICATIONS

This application claims the benefit of priority under 35 U.S.C. 119 of U.S. Provisional Patent Application Ser. No. 62/565,164, filed on Sep. 29, 2017, the disclosure of which is fully incorporated herein by reference.

BACKGROUND

This disclosure relates generally to optical connectivity and more particularly to ferrules for fiber optic connectors, fiber optic assemblies incorporating ferrules, and methods for fabricating ferrules and fiber optic assemblies incorporating ferrules.

Optical fibers are useful in a wide variety of applications, including the telecommunications industry for voice, video, and data transmissions. In a telecommunications system that uses optical fibers, there are typically many locations where fiber optic cables carrying the optical fibers connect to equipment or other fiber optic cables. To conveniently provide these connections, fiber optic connectors are often provided on the ends of fiber optic cables. The process of terminating individual optical fibers from a fiber optic cable is referred to as "connectorization." Connectorization can be done in a factory, resulting in a "pre-connectorized" or "pre-terminated" fiber optic cable, or the field (e.g., using a "field-installable" fiber optic connector).

Regardless of where installation occurs, a fiber optic connector typically includes a ferrule with one or more bores that receive one or more optical fibers. The ferrule supports and positions the optical fiber(s) with respect to a housing of the fiber optic connector. Thus, when the housing of the fiber optic connector is mated with another connector (e.g., in an adapter), an optical fiber in the ferrule is positioned in a known, fixed location relative to the housing. This allows an optical connection to be established when the optical fiber is aligned with another optical fiber provided in the mating connector. For fiber optic connectors including one or more optical fibers that extend to a front face of the ferrule, there is typically physical contact between the front faces of the mating ferrules (and typically the ends of the mating fibers) to ensure that the optical connection can be established.

As optical networks march toward 400G Ethernet, optical transceiver speeds of 25 Gb/s are becoming commonplace with four level pulse amplitude modulation (PAM4), and higher data rates are anticipated in the future. The growing complexity and speed of transceivers elevate the importance of reducing insertion loss for optical connectors. Despite this, optical connectivity remains more expensive than copper connectivity, and reducing optical connector cost is essential for optical communications to penetrate deeper into short distance applications.

Table 1 shows the connector insertion loss grades defined by International Electrotechnical Commission (IEC) standard 61753-1, Edition 1.0: 2007-03 (*Fibre optic interconnecting devices and passive components performance standard—Part 1: General and guidance for performance standards*). The loss numbers specified in the foregoing standard are based on random mate (or each-to-each) measurement as defined by IEC 61300-3-34, Edition 3.0: 2009-01 (*Examinations and measurements—Attenuation of random mated connectors*). Random mate values are closer to practical operating conditions than typical values measured by reference jumpers.

TABLE 1

| Attenuation Grade | | Random mate attenuation |
|---|---|---|
| Grade A (TBD) | ≤0.07 dB mean | ≤0.15 dB max. for >97% of samples |
| Grade B | ≤0.12 dB mean | ≤0.25 dB max. for >97% of samples |
| Grade C | ≤0.25 dB mean | ≤0.50 dB max. for >97% of samples |
| Grade D | ≤0.50 dB mean | ≤1.0 dB max. for >97% of samples |

Conventional single fiber connectors employ a precision ceramic ferrule as a means of supporting and aligning the optical fiber for obtaining low connection loss. The ferrule has tight tolerances in outer diameter, inner diameter, and concentricity. The ferrule, which typically is made of zirconia ceramics, has a diameter of 1.25 mm for LC connectors and a diameter of 2.5 mm for SC, ST, and FC connectors. An optical fiber is inserted into a micro-hole of a ferrule with a bonding agent such as epoxy. The optical fiber bonded to the ferrule undergoes cleaving, and multiple steps of polishing are applied to a fiber-ferrule assembly to obtain an end face geometry that meets requirements for a desired type of physical contact. Exemplary physical contact geometries include, but are not limited to, physical contact (PC), angled physical contact (APC), and ultra-physical contact (UPC) geometries.

Connector random mating insertion loss is determined by the offset of the center of the core from the center of the ferrule (e.g., a geometric center based on an outer surface of the ferrule), also known as core to ferrule eccentricity (CTFE), of the finished connector. Thus, CTFE represents the core to ferrule concentricity error. In conventional ferrule-based connectors, CTFE is affected primarily by: a) the concentricity between the micro-hole of the ferrule and the ferrule itself (e.g., the outer profile of the ferrule); b) the concentricity between the optical fiber and the micro-hole; and c) the concentricity between the core of the optical fiber and the cladding layer of the optical fiber. The fit between the outer diameter (OD) of the optical fiber and the inner diameter (ID) of the ferrule (as defined by the micro-hole) is very critical for low connector insertion loss. If the fiber OD is larger than the ferrule ID, or is simply too close in size to the ferrule ID, then the fiber cannot be inserted into the ferrule. Conversely, if the difference between the ferrule ID and fiber OD is too large, then such size difference will cause a wide distribution in CTFE and result in high connector insertion loss. A ferrule outer diameter and inner diameter typically have a standard deviation of 0.16 µm, while the eccentricity of a typical ferrule follows a Rayleigh distribution with a mode of 0.24 µm. The standard deviation of the outer diameter of a typical optical fiber is 0.16 µm, and the core to clad eccentricity follows a Rayleigh distribution with a mode of 0.13 µm.

FIG. 1 is a schematic cross-sectional view of a fiber core 11 within a bare optical fiber 4 that is arranged within a small diameter bore section 20 (or "micro-hole") of a ferrule 12 having a substantially cylindrical shape. The bare optical fiber 4 has an outer diameter (OD) 6 that is smaller than an inner diameter (ID) 8 of the micro-hole 20. Three vectors $r_1$, $r_2$, and $r_3$ represent three potential sources of variability in CTFE of a conventional fiber-ferrule assembly. The first vector $r_1$ represents variability in CTFE due to non-concentricity of the micro-hole 20 relative to the cylindrical shape of the ferrule 12. The second vector $r_2$ represents variability in CTFE due to difference between the OD 6 of the bare optical fiber 4 and the ID 8 of the micro-hole 20 (restated, non-concentricity of the cylindrical bare optical fiber 4 relative to the cylindrical shape of the micro-hole 20, which defines the ID 8). The third vector $r_3$ represents variability in CTFE due to non-concentricity of the fiber core 11 relative to the cylindrical shape of the bare optical fiber 4 (which defines the OD 6).

Various solutions have been proposed to improve the precision of the fiber-to-ferrule fit and cancel the eccentricities by orienting the connector. For instance, the fibers and ferrules can be pre-selected into sub-populations according to the OD and ID. Connectors are made with closely matched sub-populations of fibers and ferrules. Another proposed solution involves local expansion of a fiber by a high temperature energy source to create a tight fit into a ferrule. Still another proposed solution involves preassembly of a fiber stub and a ferrule with matched OD and ID. Thereafter, a ferrule stub assembly is fusion spliced to at least one fiber in a cable assembly.

Conventional methods that rely on ferrule-to-fiber matching, precisely controlling ferrule geometries, and/or precisely controlling a fiber-ferrule bonding process to reduce CTFE and connector insertion loss entail complicated manufacturing processes. The industry continues to seek methods for improving CTFE and reducing connector insertion loss, but with reduced manufacturing complexity and cost.

SUMMARY

Aspects of the present disclosure provide an integrated fiber-ferrule, a fiber optic assembly incorporating an integrated fiber-ferrule, and associated fabrication methods. An integrated fiber-ferrule useable as an optical coupling element includes a core that is peripherally surrounded by a cladding layer having a lower index of refraction than the core. Direct contact between an outer diameter of the core and an inner diameter of the cladding layer is provided without an intervening adhesive. An outer diameter of the cladding layer is greater than or equal to 1 mm, and is at least 20 times, at least 50 times, or at least 100 times greater than the outer diameter of the core. A fiber optic assembly is further provided, with a fusion splice joint joining a front end of an optical fiber core and a rear end of a core of the integrated fiber-ferrule. The optical fiber and the integrated fiber-ferrule each include a cladding layer having a lower index of refraction than the corresponding core, with the cladding layer of the integrated fiber-ferrule being substantially larger (e.g., at least five, at least ten, or at least twenty times larger) than the cladding layer of the optical fiber. Methods for fabricating a fiber optic assembly are further provided. A glass preform may be drawn into a glass cane and subsequently cut into one or more portions. The glass cane comprises a core and a cladding layer that peripherally surrounds the core. The cladding layer comprises a glass cladding layer material having a lower index of refraction than a glass core material of the core. An outer diameter of the cladding layer is at least 20 times, at least 50 times, or at least 100 times greater than an outer diameter of the core, and an outer diameter of the cladding layer is also equal to or greater than 1 mm. In certain embodiments, the method further comprises shaping at least a portion of the cladding layer proximate to an end face, defined by cutting at least a portion of the glass cane, to form an optical coupling element configured as an integrated fiber-ferrule.

Formation of an integrated fiber-ferrule having a core surrounded by a cladding layer having outer dimensions that substantially match a ferrule beneficially eliminates multiple sources of variability in CTFE relative to a conventional fiber-ferrule assembly, namely: (1) non-concentricity of a micro-hole of a conventional ferrule relative to the ferrule body, and (2) non-concentricity of the outer diameter of a bare optical fiber relative to the inner diameter of the micro-hole of the ferrule. As a result, use of an integrated fiber-ferrule permits CTFE and concomitant connector insertion loss to be reduced. Moreover, integrated fiber-ferrules as disclosed herein may entail reduced manufacturing complexity and cost.

In one embodiment of the disclosure, a fiber optic assembly is provided. The fiber optic assembly comprises an optical fiber, an integrated fiber-ferrule, and a fusion splice joint. The optical fiber includes a first core and a first cladding layer. The first cladding layer has a lower index of refraction than the first core. The integrated fiber-ferrule includes a second core and a second cladding layer. The second cladding layer has a lower index of refraction than the second core. The second cladding layer includes an outer diameter at least five times larger than an outer diameter of the first cladding layer. The fusion splice joint joins a front end of the first core and a rear end of the second core.

In another embodiment of the disclosure, an optical coupling element configured as an integrated fiber-ferrule is provided. The optical coupling element comprises a core and a cladding layer. The core has a first index of refraction, and is peripherally surrounded by the cladding layer. The cladding layer has a lower index of refraction than the core. The core is arranged in direct contact with the cladding layer without an adhesive arranged therebetween. An outer diameter of the cladding layer is greater than or equal to 1 mm and is at least 20 times (or 50 times, or 100 times) greater than an outer diameter of the core.

In another embodiment of the disclosure, a method for fabricating a fiber optic assembly is provided. The method comprises drawing a glass preform into a glass cane that includes a core and a cladding layer peripherally surrounding the core. The cladding layer has a lower index of refraction than the core. An outer diameter of the cladding layer is greater than or equal to 1 mm and is at least 20 times (or 50 times, or 100 times) greater than an outer diameter of the core. The method further comprises cutting at least a portion of the glass cane.

Additional features and advantages will be set forth in the detailed description which follows, and in part will be readily apparent to those skilled in the technical field of optical connectivity. It is to be understood that the foregoing general description, the following detailed description, and the accompanying drawings are merely exemplary and intended to provide an overview or framework to understand the nature and character of the claims.

BRIEF DESCRIPTION OF THE DRAWINGS

The accompanying drawings are included to provide a further understanding, and are incorporated in and constitute a part of this specification. The drawings illustrate one or more embodiment(s), and together with the description serve to explain principles and operation of the various embodiments. Features and attributes associated with any of the embodiments shown or described may be applied to other embodiments shown, described, or appreciated based on this disclosure.

DETAILED DESCRIPTION

Various embodiments will be further clarified by examples in the description below. As will be discussed in more detail below, the description generally relates to an integrated fiber-ferrule useable as an optical coupling element that includes a core comprising an optically transmissive material having a first index of refraction, and a cladding layer that peripherally surrounds the core and that has a lower index of refraction than the optically transmissive material of the core. An outer diameter of the core is arranged in direct contact with an inner diameter of the cladding layer without an adhesive arranged therebetween. An outer diameter of the cladding layer is at least 100 times greater than the outer diameter of the core. A fiber optic assembly is further provided. The fiber optic assembly includes a fusion splice joint joining a front end of an optical fiber core and a rear end of the core of the integrated fiber-ferrule. Each of the optical fiber and the integrated fiber-ferrule include a cladding layer having a lower index of refraction than the corresponding core. The cladding layer of the integrated fiber-ferrule is substantially larger (e.g., at least five or more times larger) than the cladding layer of the optical fiber. The integrated fiber-ferrule has a lower core to ferrule eccentricity than a conventional fiber-ferrule assembly in which a fiber and ferrule are produced separately and then assembled together. Methods for fabricating a fiber optic assembly are further provided. A glass preform may be drawn into a glass cane and subsequently cut into at least one portion. The glass cane comprises a core and a cladding layer that peripherally surrounds the core. The cladding layer comprises a glass cladding layer material having a lower index of refraction than a glass core material of the core. An outer diameter of the cladding layer is at least 100 times greater than an outer diameter of the core. In certain embodiments, a method may further include shaping at least a portion of the cladding layer proximate to an end face defined by cutting at least a portion of the glass cane, to form an optical coupling element configured as an integrated fiber-ferrule.

Figure 2:
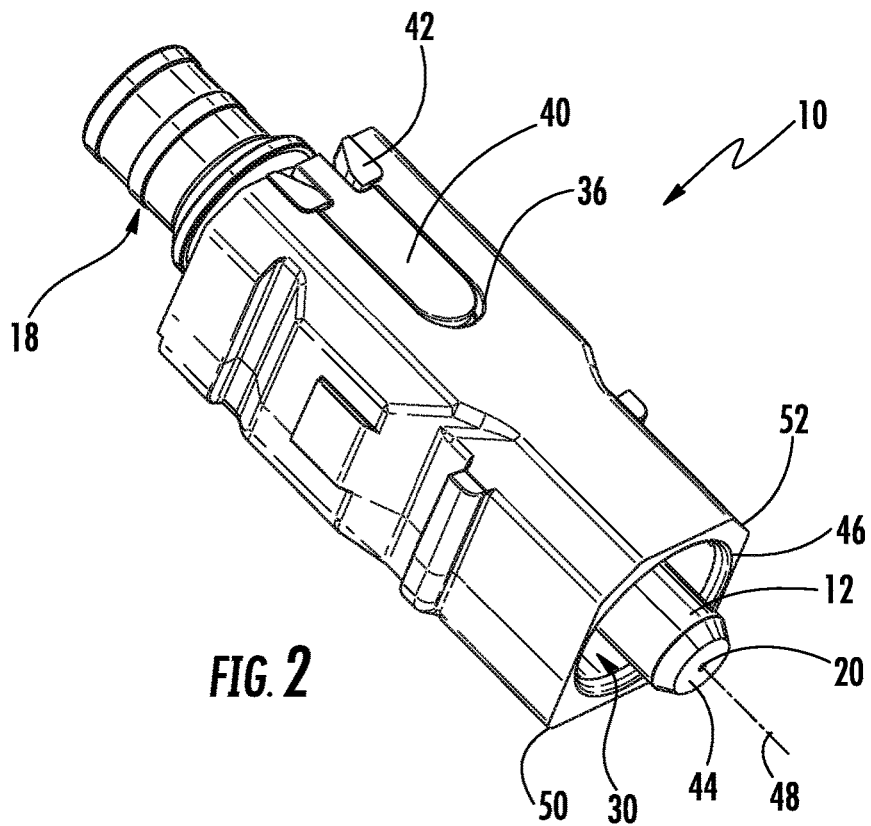
FIG. 2 is a perspective view of an example of a conventional fiber optic connector incorporating an optical fiber retained in a bore of a ferrule.
Figure 3:
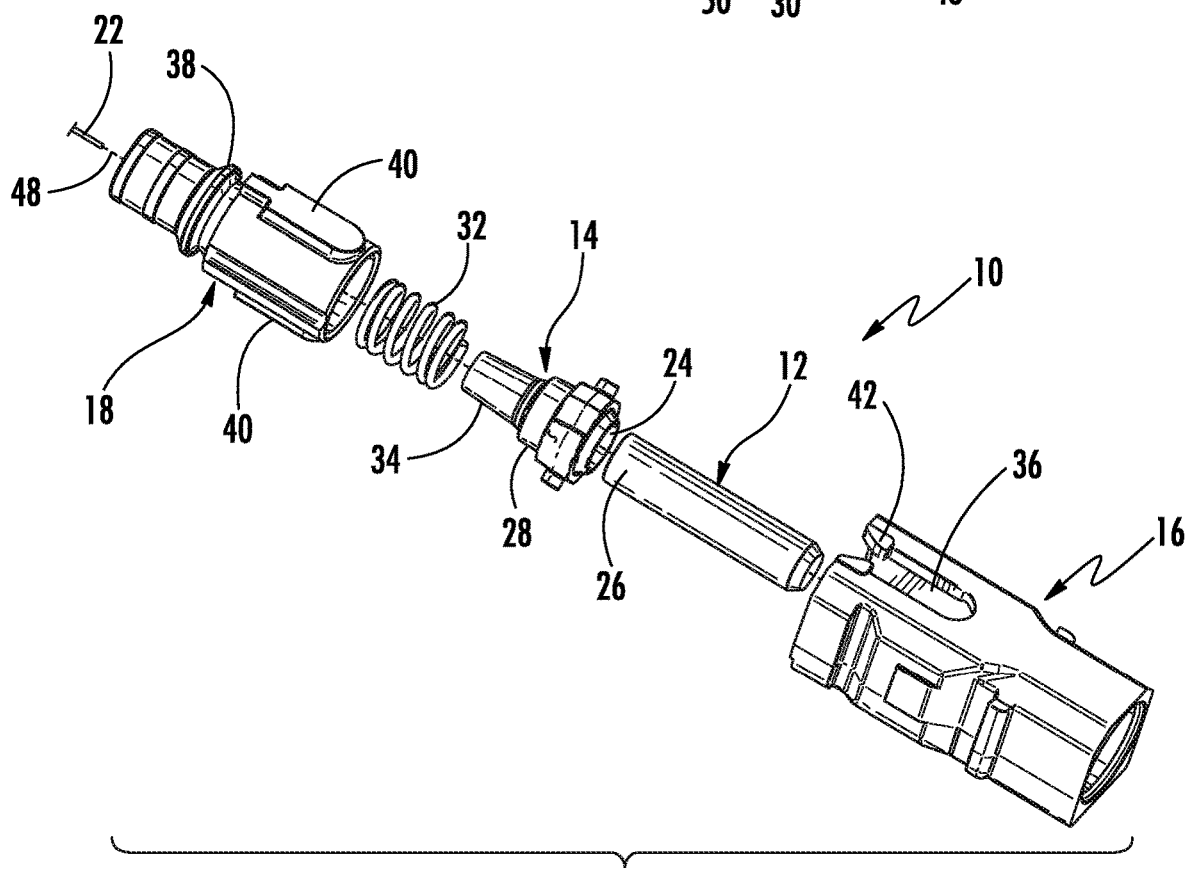
FIG. 3 is an exploded view of the fiber optic connector of FIG. 2.
Figure 4:
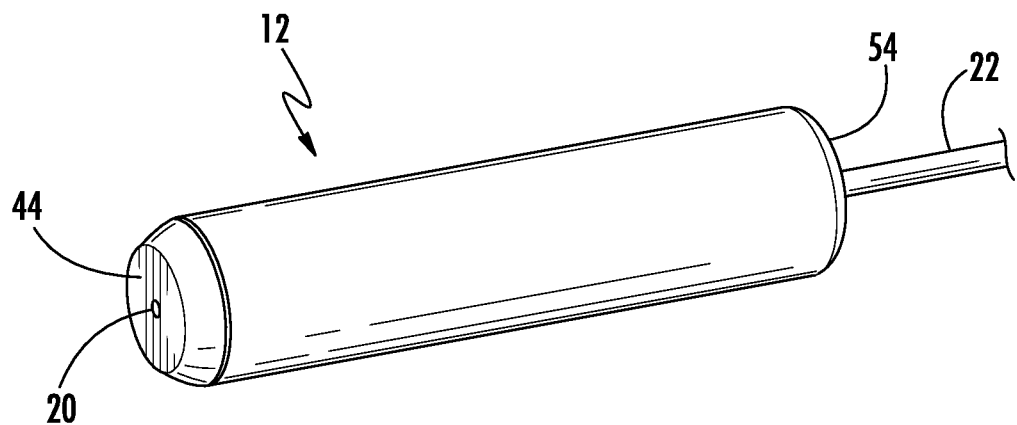
FIG. 4 is a perspective view of the ferrule of the fiber optic connector of FIGS. 2 and 3, with the optical fiber received by the ferrule.
Figure 5:
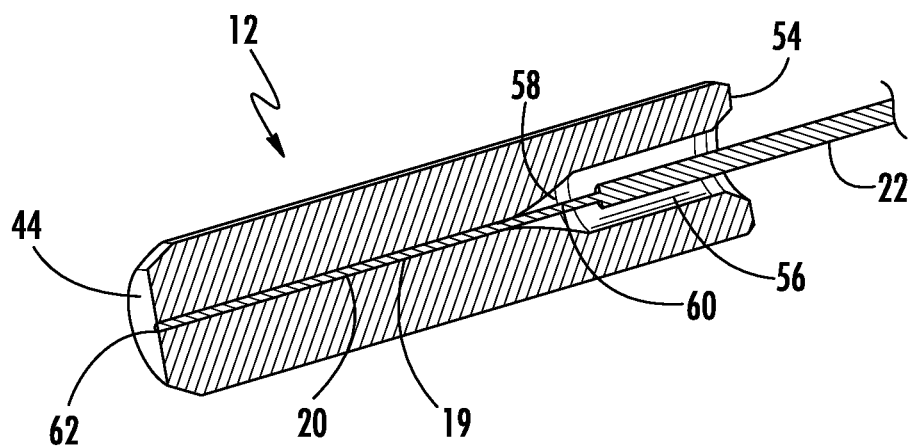
FIG. 5 is a cross-sectional view of the ferrule and optical fiber according to FIG. 4.

Before discussing integrated fiber-ferrule embodiments as well as associated fiber optic assemblies and fabrication methods, a brief overview of a connector 10 shown in FIGS. 2 and 3, as well as a conventional ferrule 12 shown in FIGS. 4 and 5, will be provided to facilitate discussion. It is to be appreciated that integrated fiber-ferrules shown in subsequent figures may be used with the same type of connector as the connector 10, in lieu of the conventional ferrule 12. Although the connector 10 is shown in the form of a SC-type connector, persons skilled in the field of optical connectivity will appreciate that the connector 10 is merely an example, and that the general principles disclosed with respect to integrated fiber-ferrules and other components shown in subsequent figures may also be applicable to other connector designs, such as LC-type connectors.

As shown in FIGS. 2 and 3, the connector 10 includes the ferrule 12, a ferrule holder 14 from which the ferrule 12 extends, a housing 16 having a cavity 30 in which the ferrule holder 14 is received, and a connector body 18 configured to retain the ferrule holder 14 within the housing 16. The connector body 18 may also be referred to as "retention body 18" or "crimp body 18". One portion of the connector body 18 is received in the housing 16. The ferrule 12 includes a small diameter bore section 20 (or micro-hole, as previously shown in FIG. 1) configured to support a bare (e.g., stripped of any coating layer) section of an optical fiber 22, with the bare section of optical fiber 22 being securable in the small diameter bore section 20 using an adhesive material (e.g., epoxy). The ferrule holder 14 includes a ferrule holder bore 24 from which the ferrule 12 extends. More specifically, a rear portion 26 of the ferrule 12 is received in the ferrule holder bore 24 defined in (at least) a first portion 28 of the ferrule holder 14, and is secured therein in a known manner (e.g., press-fit, adhesive, molding the ferrule holder 14 over the rear portion 26 of the ferrule 12, etc.). The ferrule 12 and ferrule holder 14 may optionally comprise a monolithic structure. The ferrule holder 14 is biased to a forward position within the cavity 30 of the housing 16 by a spring 32, which extends over a second portion 34 of the ferrule holder 14 that has a reduced cross-sectional diameter/width compared to the first portion 28.

FIGS. 2 and 3 illustrate a rear portion of the housing 16 having cut-outs or slots 36 on opposite surfaces so as to define a split shroud. The connector body 18 is generally tubular in shape with a medial shoulder 38 arranged between different diameter portions. The connector body 18 further includes protrusions 40 (which may embody tabs) configured to be snapped into the slots 36 of the housing 16 and retained therein due to the geometries of the components and the presence of locking tabs 42 proximate to a leading edge of each slot 36 of the housing 16.

When the connector 10 is assembled as shown in FIG. 2, a front end 44 of the ferrule 12 projects beyond a front end 46 of the housing 16. The front end 44 of the ferrule 12 presents the optical fiber 22 retained therein for optical coupling with a mating component (e.g., another fiber optic connector; not shown), with the ferrule 12 serving to generally align the optical fiber 22 along a longitudinal axis 48. The housing 16 includes a roughly rectangular cross-sectional shape perpendicular to the longitudinal axis 48, with two adjacent non-beveled corners 50 and two adjacent beveled corners 52 embodying transitions between four outer faces of the housing 16 proximate to the front end 46 of the housing 16. The non-beveled corners 50 and the beveled corners 52 in combination ensure that the connector 10 must be in a specific orientation when received by a connector receiving structure (e.g., a female connector, a socket, a receptacle, etc. (not shown)).

FIGS. 4 and 5 provide perspective and cross-sectional views, respectively, of the ferrule 12 that was previously shown in FIGS. 2 and 3 as part of the connector 10. The ferrule 12 is generally cylindrical in shape, and defines a bore 19 extending between front and rear ends 44, 54. Exemplary materials for fabrication of the ferrule 12 include ceramic or glass. As shown in FIG. 5, the bore 19 comprises the small diameter bore section 20, a larger diameter bore section 56, and an intermediate bore section 58. The intermediate bore section 58 has a tapered diameter and extends between the small diameter bore section 20 and the larger diameter bore section 56. The larger diameter bore section 56 is proximate to the rear end 54 of the ferrule 12 (e.g., the larger diameter bore section 56 extends inward from the rear end 54), and the small diameter bore section 20 extends from the intermediate bore section 58 to the front end 44 of the ferrule 12. A segment of (coated) optical fiber 22 is received by the larger diameter bore section 56, and transitions to a segment of bare optical fiber 60 that has a smaller diameter than the segment of coated optical fiber 22 and that is received by the small diameter bore section 20. An adhesive material, such as epoxy (not shown), may be provided between the segment of bare optical fiber 60 and the small diameter bore section 20 to secure the segment of bare optical fiber 60 to the ferrule 12. With continued reference to FIG. 5, the segment of bare optical fiber 60 extends to the front end 44 of the ferrule 12, and includes a terminal end 62 that is substantially flush with the front end 44. This terminal end 62 is typically polished to attain a desired fiber flatness and finish suitable for mating with a suitably prepared fiber of a mating connector or receptacle (not shown).

Now that general overviews of the connector 10 and the ferrule 12 have been provided, embodiments of the present disclosure will be described.

Figure 6:
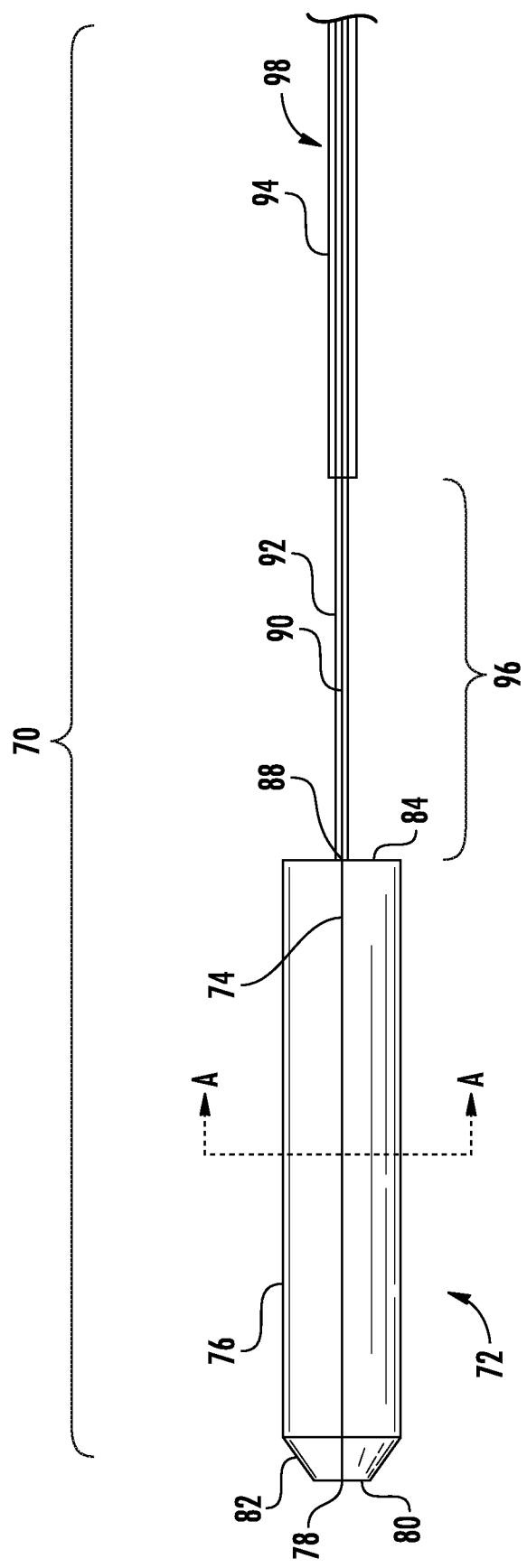
FIG. 6 is a side elevation view of a fiber optic assembly according to one example, including an integrated fiber-ferrule joined by a splice joint to an optical fiber.

FIG. 6 is a side elevation view of a fiber optic assembly 70 according to one example, including an integrated fiber-ferrule 72 joined by a splice joint 88 to an optical fiber 98. The core 74 of the integrated fiber-ferrule 72 is peripherally surrounded with a cladding layer 76 formed of a material having a lower index of refraction than material of the core 74. In certain embodiments, the core 74 and the cladding layer 76 both comprise silica glass materials. Preferably, the cladding layer 76 has an outer diameter that matches the outer diameter of a conventional ferrule (e.g., a diameter of 1.25 mm for LC connector ferrules and a diameter of 2.5 mm for SC, ST, and FC connector ferrules), and the core 74 has an outer diameter that matches the diameter of a conventional single mode optical fiber (such as the core 90 of the optical fiber 98), in a range of about 8-9 μm, or matches the diameter of a multi-mode fiber with a diameter of about 50 μm or about 62.5 μm. The integrated fiber-ferrule 72 includes a front end face 80 and a rear end face 84 that are on opposite ends of the integrated fiber-ferrule 72. A front end 78 of the core 74 of the integrated fiber-ferrule 72 is exposed at the front end face 80. Proximate to the front end face 80 of the integrated fiber-ferrule 72, the cladding layer 76 is shaped to form a bevel 82 that surrounds the front end face 80. Shaping of the cladding layer 76 proximate to the front end face 80 may be performed in accordance with a geometry requirement for a particular type of physical contact. As mentioned above, examples of different physical contact geometries include, but are not limited to, physical contact (PC), angled physical contact (APC), and ultra-physical contact (UPC) geometries. While ends of conventional ceramic ferrules are typically shaped by mechanical abrasion (e.g., mechanical polishing), when the cladding layer 76 and the core 74 both comprise glass, in certain embodiments the cladding layer 76 and the front end 78 of the core 74 along the front end face 80 may be finished completely by laser processing (e.g., laser ablation) without material removal by mechanical abrasion. Nevertheless, if desired in some embodiments, mechanical abrasion may be used, optionally in conjunction with laser processing, for finishing one or both end faces 80, 84 of the integrated fiber-ferrule 72. The rear end face 84 of the integrated fiber-ferrule 72 may be polished flat and edge chamfered by laser or mechanical means to achieve a rear end face geometry consistent with that of a conventional ferrule.

In certain embodiments, at least a portion (e.g., an outer portion) of the cladding layer 76 may be doped with a material comprising titanium dioxide ($TiO_2$), which greatly strengthens the cladding layer 76, particularly at surfaces thereof. In certain embodiments, additional and/or other dopant materials containing titanium could be used. The strengthened surface properties of the cladding layer 76 enables repeated connection operations and handling of a connector (not shown) incorporating the integrated fiber-ferrule 72, without fear of surface damage. In certain embodiments, a doping profile of at least one dopant (e.g., titanium dioxide) within the cladding layer 76 may be non-uniform with respect to position (e.g., in a gradient or stepwise fashion in a manner varying with radial position, optionally to provide increased doping proximate to an outer surface in the form of a strengthened surface layer) in the integrated fiber-ferrule 72. The strengthened surface layer can comprise 5-30 wt. % $TiO_2$, or 10-20 wt. % $TiO_2$ in certain embodiments. In certain embodiments, a radial thickness of the strengthened surface layer is at least 5 μm. In some embodiments, the radial thickness of the strengthened surface layer is in a range of from 5 μm to 250 μm.

The core 90 of the optical fiber 98 is peripherally surrounded with a cladding layer 92 having a lower index of refraction than the core 90, and the cladding layer 92 is peripherally surrounded with a polymeric coating 94. The polymeric coating 94 serves to protect the light-carrying ability of the optical fiber 98 (which is made possible by the different indexes of refraction of the core 90 and the cladding layer 92) and to preserve the strength of the optical fiber 98. It is typically necessary to remove (e.g., strip) a polymeric coating to enable an optical fiber to be terminated or joined to another component. As shown in FIG. 6, a portion of the optical fiber 98 has been stripped of the polymeric coating 94 to yield a stripped section 96 (also referred to as "bare fiber" or "bare section", or even "bare glass section" when the core 90 and cladding layer 92 each comprise glass). The portion of the optical fiber 98 with the polymeric coating 94 remaining may be referred to as a "pre-coated section" of the optical fiber 98.

Although it was previously mentioned that the splice joint 88 serves to join the core 74 of the integrated fiber-ferrule 72 and the core 90 of the optical fiber 98, the splice joint 88 also serves to join the cladding layer 92 of the optical fiber 98 to a portion of the cladding layer 76 of the integrated fiber-ferrule 72. Fusion splicing has been proven as a reliable method for making cable assemblies in both factory manufacturing contexts and non-factory contexts (i.e., "in the field"). However, unlike conventional fusion splicing in which the ends of two optical fibers (e.g., an optical fiber extending from a cable and a "stub" optical fiber extending from a ferrule) are both accessible to a conventional electric arc-based fusion splicer, the splice joint 88 may desirably be produced using lasers with wavelengths that are absorbed by silica, such as $CO_2$ lasers or quantum cascade lasers. To promote alignment of the core 90 of the optical fiber 98 and the core 74 of the integrated fiber-ferrule 72, alignment techniques such as machine vision or active monitoring of optical power coupled through the splice joint 88 during its fabrication may be used. Typical insertion loss values for actively aligned fusion splices are less than 0.02 dB. Thus, even with this "extra" splice joint 88 (which is not present in a conventional fiber-ferrule assembly), the total insertion loss of a connector embodying the integrated fiber-ferrule 72 is less than the insertion loss of a similar connector embodying a conventional fiber-ferrule assembly.

Figure 1:
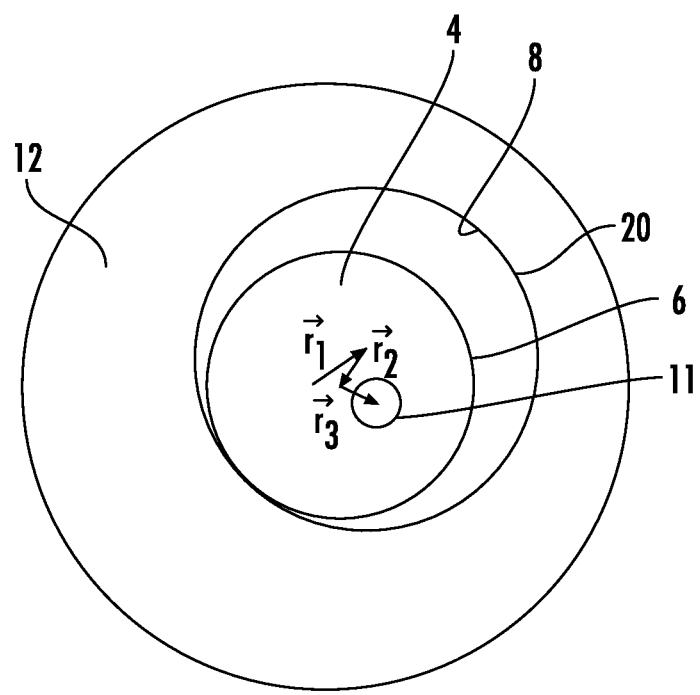
FIG. 1 is a cross-sectional schematic view of a fiber core within a bare optical fiber that is arranged within a small diameter bore section of a ferrule 12, with three vectors representing potential sources of variability in core to ferrule eccentricity of a conventional fiber-ferrule assembly.
Figure 7:
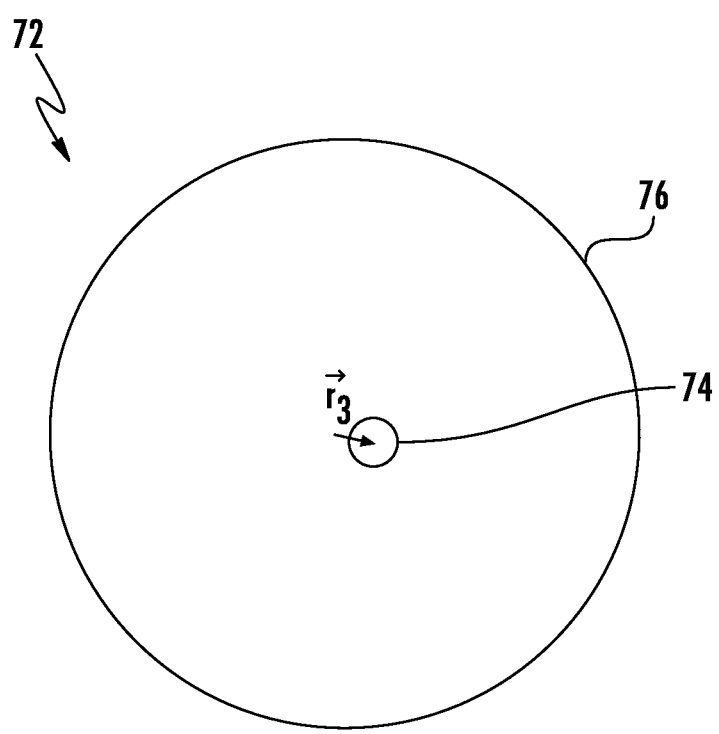
FIG. 7 is a cross-sectional schematic view of the integrated fiber-ferrule of FIG. 6, with a single vector representing potential variability in eccentricity between a core of the integrated fiber-ferrule and a geometric center of the integrated fiber-ferrule.

FIG. 7 is a cross-sectional schematic view of the integrated fiber-ferrule 72 of FIG. 6 (taken along section line A-A in FIG. 6), showing the core 74 arranged within the interior of the cladding layer 76. Ideally, the core 74 and the cladding layer 76 would be perfectly concentric. Since the integrated fiber-ferrule 72 may be produced by a precision drawing process similar to optical fiber, the outer diameter tolerance and the core to cladding concentricity benefits of optical fiber drawing are maintained. Without a tolerance stack-up inherent to using a conventional ferrule-fiber assembly, the core to ferrule eccentricity (or, more specifically, the core to cladding layer eccentricity) is directly controlled by the drawing process. In certain embodiments, the integrated fiber-ferrule 72 comprises a core to ferrule eccentricity of less than about 1.0 μm, less than about 0.8 μm, or less than about 0.5 μm. Moreover, the core 74 is inherently parallel to the mechanical axis of the cladding layer 76, thereby eliminating any angular errors. A single vector $r_3$ represents variability in CTFE due to non-concentricity of the core 74 relative to the cladding layer 76. In comparison to FIG. 1, FIG. 7 shows the integrated fiber-ferrule 72, including the core 74 surrounded by the cladding layer 76, having outer dimensions that substantially match a conventional ferrule, which beneficially eliminates multiple sources of variability in CTFE relative to the conventional fiber-ferrule assembly of FIG. 1, namely: (1) non-concentricity of a micro-hole of a conventional ferrule relative to a ferrule body (according to vector $r_1$ shown in FIG. 1), and (2) non-concentricity of the outer diameter of a bare optical fiber relative to the inner diameter of the micro-hole of a ferrule (according to vector $r_2$ shown in FIG. 1).

Figure 8:
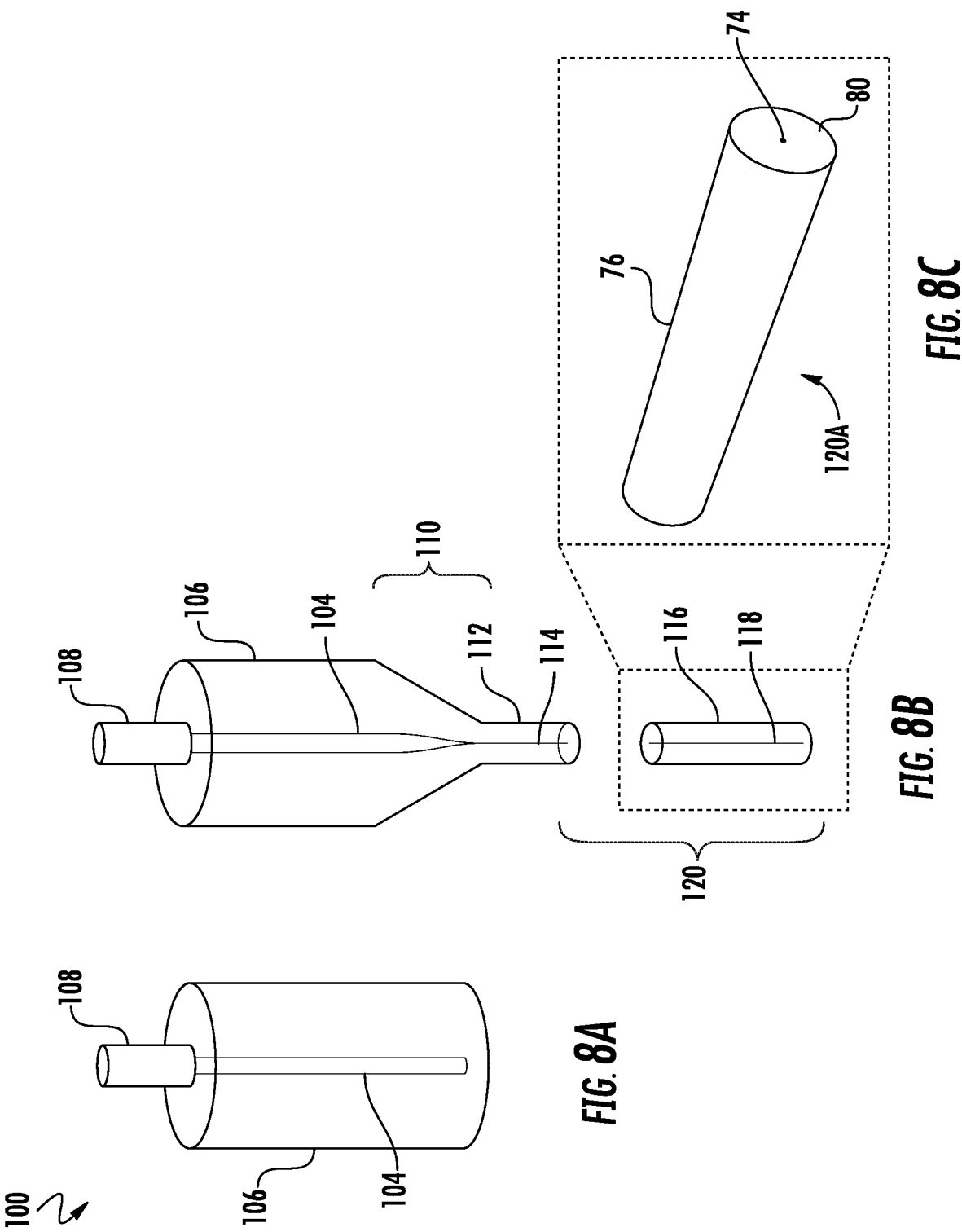
FIG. 8A is a perspective schematic view of a glass preform including a core and a cladding layer.
FIG. 8B is a perspective schematic view of the glass preform of FIG. 8A subjected to a drawing process to draw the glass preform into a glass cane with a reduced diameter core and a reduced diameter cladding layer.
FIG. 8C is a perspective view of a section of the glass cane of FIG. 8B.

FIGS. 8A-8C schematically illustrate a process of directly drawing an integrated fiber-ferrule with a core substantially similar to the core of a single mode fiber and with a cladding diameter substantially matching that of a standard ferrule. FIG. 8A illustrates a glass preform 100 including a core 104 and a cladding layer 106, suspended from a support 108. Glass preforms are known in the art as precursors for making optical fibers. Conventional glass preforms may be made by chemical vapor phase deposition, in which gaseous silicon tetrachloride compounds, dopant material (such as germanium chloride), and oxygen are oxidized (burned) to form a white porous silica-based material (known as "soot") subject to deposition on a target surface. The deposition process forms a soot preform consisting of a core and a cladding layer. The refractive index of each layer of soot may be changed by varying an amount of dopant material being oxidized. Various types of conventional vapor phase deposition that may be used include, but are not limited to: outside vapor deposition (OVD), vapor axial deposition (VAD), modified chemical vapor phase deposition (MVCD), or plasma chemical vapor deposition (PCVD). Soot material deposited by chemical vapor phase oxidation may be transformed from a porous material into a solid glass preform (such as the glass preform 100 shown in FIG. 8A) through a sintering process by heating the porous material to a temperature below a glass melting point, for example 1450° C. In certain embodiments, the glass preform 100 includes a core clad ratio in a range of from about 0.003 to about 0.06 (for example, about 0.0032, 0.0064, 0.01, 0.02, 0.025, or 0.05). In certain embodiments, the core of the glass preform 100 has a relative refractive index change to the cladding layer in a range of 0.3 to 2.2% (for example, 0.34%, 0.5%, 1%, or 2%). After formation, the glass preform 100 is be subject to a drawing or pulling process to form a glass cane having a reduced diameter core and a reduced diameter cladding layer.

FIG. 8B illustrates the glass preform of FIG. 8A being subjected to a drawing process to draw the glass preform 100 into a glass cane 120. A typical drawing process may involve feeding the glass preform 100 into a drawing furnace (not shown) that softens at least a lower portion 110 of the glass preform 100 to the glass melting point. The softened glass preform 100 will flow downward due to gravity (optionally aided by pulling, according to a continuous drawing process), causing its length to be extended and causing the core 104 and the cladding layer 106 to shrink in diameter, while maintaining their relative diametric ratio. As shown in FIG. 8B, the lower portion 110 of the glass preform 100 includes a reduced diameter core 114 and a reduced diameter cladding layer 112. When a desired core and outer diameter dimensions are reached and the glass material is cooled and solidified, an elongated glass cane 120 having a core 118 and a cladding layer 116 is produced. In certain embodiments, the core 118 of the glass cane 120 has a diameter in a range of 8-9 μm to match the core of single mode fiber, or a diameter of about 50 or about 62.5 μm to match the core of the multi-mode fiber, and the cladding layer 116 includes a diameter in a range of less than about 4 mm, such as in a range of 1-3 mm. As specific examples, the cladding layer 116 may have a diameter of about 1.25 mm or about 2.5 mm. To this end, in certain embodiments, the cladding layer 116 includes a diameter in a range of 1.249±0.0005 mm, or in a range of 2.499±0.0005 mm, with these tight diametric tolerance values (±0.0005 mm) being achievable using glass preform drawing processes already in use for drawing optical fibers. In certain embodiments, these diametric tolerance values may be relaxed to ±0.0010 mm. In certain embodiments, the core 118 comprises a mode field diameter matching a mode field diameter of a standard single-mode fiber, with a low cutoff wavelength (e.g., preferably lower than 1310 nm) in order to eliminate potential excitation of high order modes and associated multi-pass interference.

Referring to FIG. 8C, either during or after the drawing process, the glass cane 120 may be diced (cut) into one or more (preferably multiple) integrated fiber-ferrule stubs 120A each having a length extending in a direction parallel to the core 74. Exemplary length values for one or more integrated fiber-ferrule stubs 120A include 6.4 mm, 10.5 mm, or 12.7 mm. For single mode connector applications, the cutoff wavelength of each integrated fiber-ferrule stub 120A is preferably lower than 1310 nm, in order to eliminate potential excitation of high order modes and associated multi-pass interference. A dicing or cutting process also forms at least one end face 80 exposing portion of the core 74 peripherally surrounded by the cladding layer 76. Such an end face 80 may be perpendicular to the core 74, with the core 74 being flush with the cladding layer 76. In certain embodiments, an integrated fiber-ferrule stub 120A may be subject to shaping steps (e.g., along one or both end faces of the integrated fiber-ferrule stub 120A) to form an integrated fiber-ferrule as disclosed herein. Alternatively, in certain embodiments, a cut end face of an elongated glass cane 120 may be subject to one or more shaping steps prior to separation of an individual fiber-ferrule stub from the glass cane 120.

Figure 9:
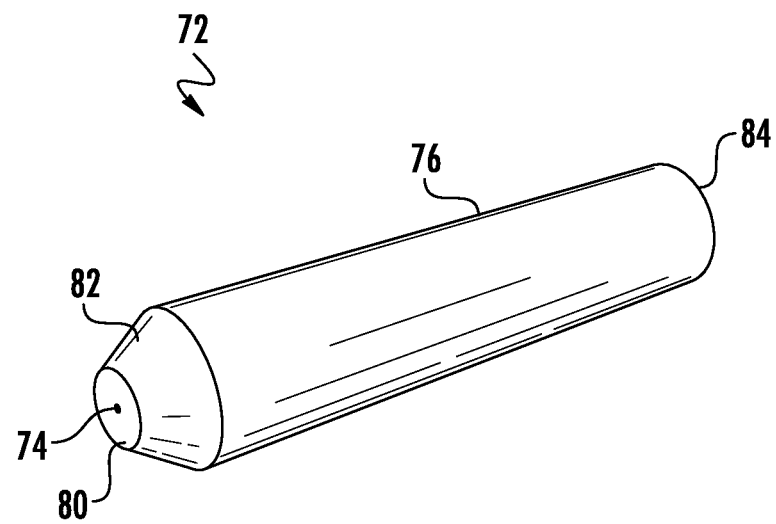
FIG. 9 is a perspective view of an integrated fiber-ferrule formed by shaping at least a portion of a cladding layer proximate to an end face, with such shaping being in accordance with a geometry requirement for one type of physical contact connector.

FIG. 9 illustrates an integrated fiber-ferrule 72 that may be formed by shaping one or more end portions of an integrated fiber-ferrule stub (e.g., an integrated fiber-ferrule stub 120A according to FIG. 8C). Such shaping is preferably in accordance with a geometry requirement for a type of physical contact (which includes but is not limited to PC, APC, and UPC geometries). The integrated fiber-ferrule 72 includes front and rear end faces 80, 84. As shown, the cladding layer 76 is shaped proximate to the front end face 80 to form a bevel 82 that surrounds the front end face 80. Such shaping may be performed exclusively using a laser; alternatively, mechanical polishing or a combination of mechanical polishing and laser ablation may be used. The rear end face 84 may be polished flat and edge chamfered by laser or mechanical means.

Figure 10:
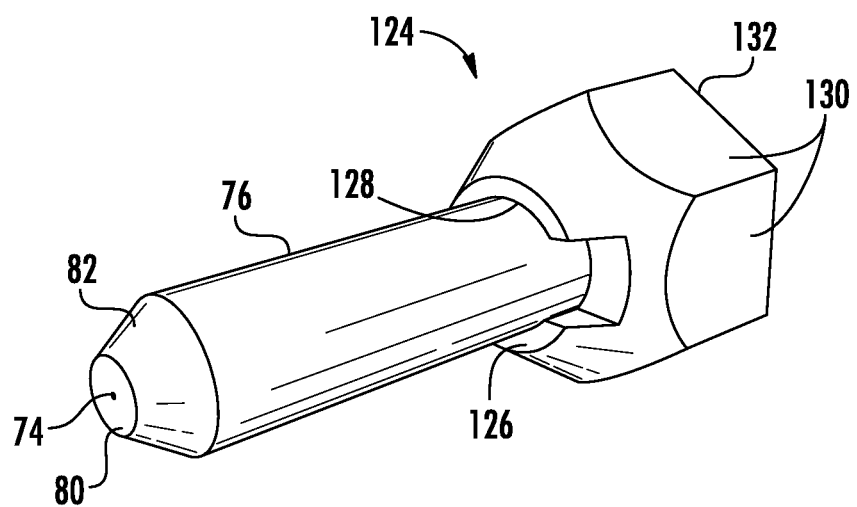
FIG. 10 is a perspective view of an integrated fiber-ferrule with a ferrule holder surrounding a portion of a cladding layer proximate to a rear end face of the integrated fiber-ferrule.

FIG. 10 illustrates the integrated fiber-ferrule 72 of FIG. 9 following assembly of the integrated fiber-ferrule 72 with a ferrule holder 124 that surrounds a portion of the cladding layer 76 proximate to the rear end face 84 (shown in FIG. 9). The ferrule holder 124 includes a front end 126, includes hexagonal body structure 132, and defines a cylindrical aperture 128 that receives a rear portion of the integrated fiber-ferrule 72. The hexagonal body structure 132 includes multiple flat faces 130 and may be used to aid in placing and maintaining the integrated fiber-ferrule 72 in a desired rotational position. In certain embodiments, the ferrule holder 124 may be pressed and/or adhesively bonded to the integrated fiber-ferrule 72. In other embodiments, the ferrule holder 124 may be molded or otherwise deposited around an exterior of the integrated fiber-ferrule 72.

Figure 11:
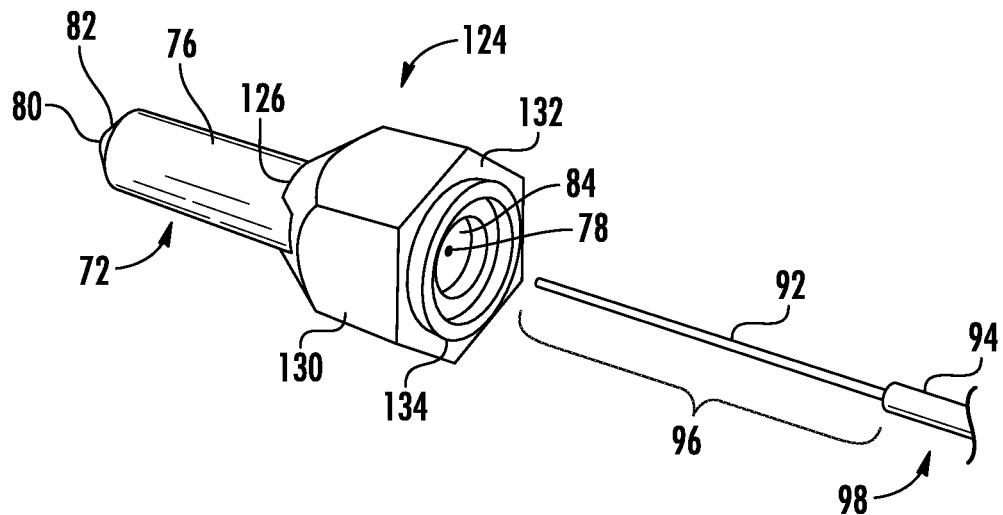
FIG. 11 is a perspective view of the ferrule holder and integrated fiber-ferrule of FIG. 10, with a stripped section of optical fiber (exposing a cladding layer thereof) aligned with a core of the integrated fiber-ferrule in preparation for fusion splicing.

FIG. 11 is a perspective assembly view of the ferrule holder 124 and integrated fiber-ferrule 72 of FIG. 10, with a stripped section 96 of optical fiber 98 (exposing a cladding layer 92 of the optical fiber 98) being aligned with a core 78 of the integrated fiber-ferrule 72. Such positioning is in preparation for forming a fusion splice joint between the stripped section 96 and the integrated fiber-ferrule 72. As shown, the ferrule holder 124 includes an annular handle 134 that extends rearward from the hexagonal body structure 132, with the annular handle 134 being short in length. The short length of the annular handle 134 permits a laser beam (not shown) to impinge on the core 78 exposed along the rear face 84 of the integrated fiber-ferrule 74, thereby permitting fusion splicing between the integrated fiber-ferrule 72 and the stripped section 96 of the optical fiber 98 after the ferrule holder 124 is provided over a rear portion of the integrated fiber-ferrule 72.

Figure 12:
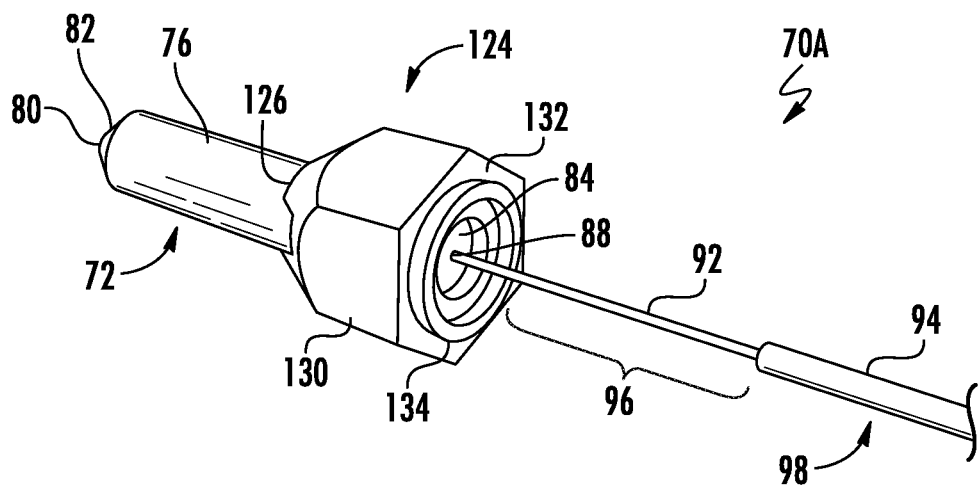
FIG. 12 is a perspective view of a fiber optic assembly including the ferrule holder and integrated fiber-ferrule of FIG. 11 following fusion splicing of an end of the stripped section of optical fiber to the core of the integrated fiber-ferrule.

FIG. 12 illustrates a fiber optic assembly 70A including the ferrule holder 124 and integrated fiber-ferrule 72 of FIG. 11 following laser fusion splicing between the integrated fiber-ferrule 72 and the stripped section 96 of the optical fiber 98. Such fusion splicing forms a splice joint 88 along the rear end face 84, with respective cores (not shown) of the integrated fiber-ferrule 72 and the optical fiber 98 preferably being aligned with and fused to one another. At the splice joint 88, the (smaller diameter) cladding layer 92 of the optical fiber 98 is also fused to the (larger diameter) cladding layer 76 of the integrated fiber-ferrule 72. The splice joint 88 provides an attachment that is permanent in character. In certain embodiments, the splice joint 88 may be produced by impingement of laser emissions that are absorbed by silica, such as emissions of $CO_2$ lasers or quantum cascade lasers.

Figure 13:
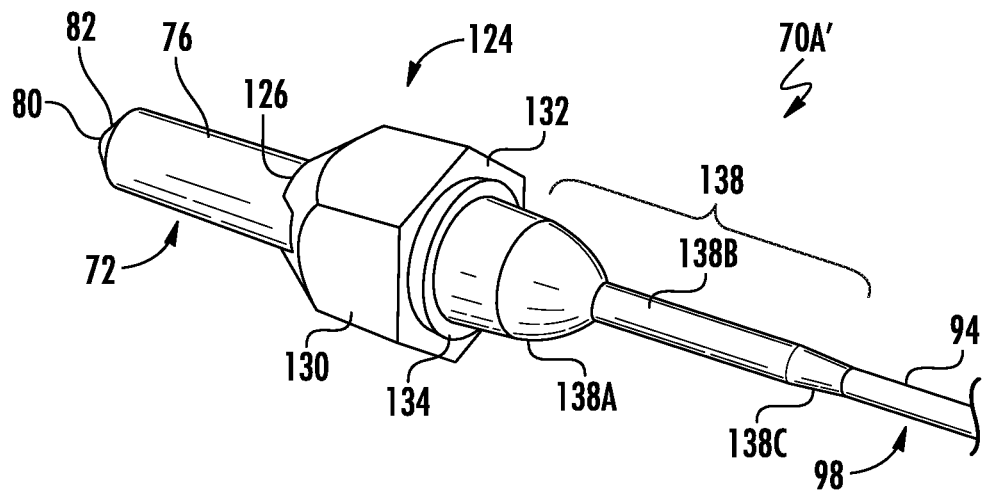
FIG. 13 is a perspective view of a protected fiber optic assembly following addition of a covering material encasing a rear portion of a ferrule holder, a fusion splice joint, and a stripped section of optical fiber.

FIG. 13 illustrates a protected fiber optic assembly 70A' based on the fiber optic assembly 70A of FIG. 12, following addition of a covering material 138 providing strain relief and overcoating utility to portions of the fiber optic assembly 70A'. In particular, the covering material 138 includes a first large diameter portion 138A encasing a rear portion of the ferrule holder 124 and the fusion splice joint 88 (shown in FIG. 12), an intermediate diameter portion 138B covering the stripped section 92 (shown in FIG. 12) of the optical fiber 98, and a terminal portion 138C covering a portion of the polymeric coating 94 of the optical fiber 98. The annular handle 134 extending rearward from the hexagonal body structure 132, in combination with the rear end face 84 (shown in FIGS. 11 and 12), form a rear-facing recess into which the covering material 138 extends. Such rear-facing recess assists in retaining the covering material 138 along a rear portion of the integrated fiber-ferrule 72. In certain embodiments, the covering material 138 embodies a unitary member that may be fabricated from UV-curable adhesives, heat curable adhesives, thermoplastic materials, or other (e.g., polymeric) materials. If desired, a removable mold or other three-dimensional template (not shown) may be positioned proximate to the ferrule holder 124 to receive and maintain the covering material 138 (or a precursor thereof) during a hardening or curing process, in order to permit the solidified covering material to attain a desired shape. Provision of the covering material 138 may prevent mechanical damage of the fusion splice joint, inhibit small-radius bending of the optical fiber 98 proximate to the integrated fiber-ferrule 72, prevent intrusion of moisture and particulate material, and serve to protect the light-carrying ability of the previously stripped section 92 of the optical fiber 98.

Figure 14:
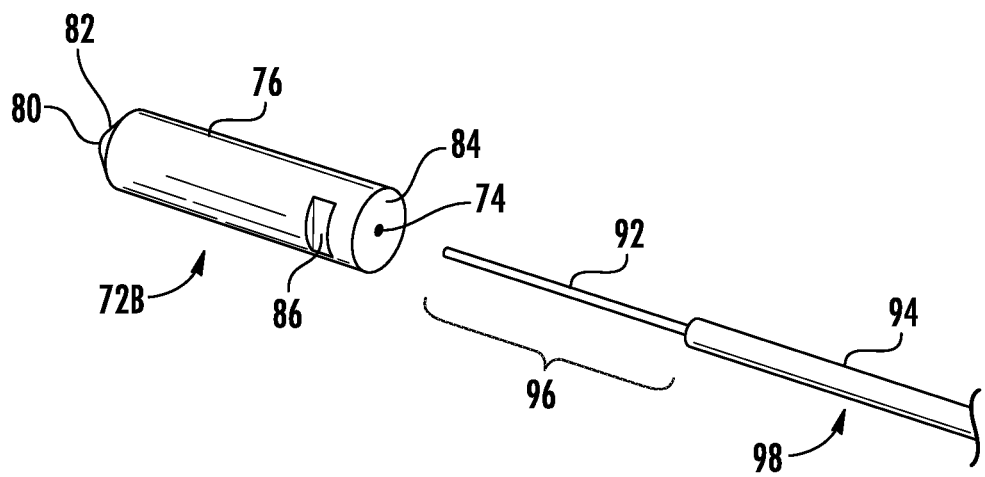
FIG. 14 is a perspective view of an integrated fiber-ferrule including a recess defined in a sidewall thereof according to one embodiment, with a stripped section of optical fiber (exposing a cladding layer thereof) aligned with a core of the integrated fiber-ferrule in preparation for fusion splicing.

FIG. 14 is a perspective assembly view of an integrated fiber-ferrule 72B according to another embodiment, with a stripped section 96 of optical fiber 98 being aligned with a core 74 of the integrated fiber-ferrule 72B. Such positioning is in preparation for forming a fusion splice joint between the stripped section 96 and the integrated fiber-ferrule 72B. The integrated fiber-ferrule 72B is substantially the same as the integrated fiber-ferrule 72 shown in FIGS. 10-13, except that the integrated fiber-ferrule 72B includes a recess 86 defined in a sidewall of the cladding layer 76. In other words, the recess 86 is a lateral recess in a lateral surface (i.e., an outer surface between the front end face 80 and rear end face 84) of the integrated fiber-ferrule 72B. The recess 86 may be formed by machining (e.g., mechanical grinding or waterjet cutting) or other conventional means after formation of an integrated fiber-ferrule stub 120A (shown in FIG. 8C). The recess 86 preferably does not extend radially inward far enough to contact the core 74. In certain embodiments, the recess 86 is positioned closer to the rear end face 84 than to the front end face 80 of the integrated fiber-ferrule 72B. This is consistent with an intended function of the recess 86 to serve as an anchoring feature for a covering material that may form a combined ferrule holder/splice protector proximate to a rear portion of the integrated fiber-ferrule 72B (as will be shown and described in connection with FIG. 16). Exposure of the rear end face 84 of the integrated fiber-ferrule 72B without presence of a surrounding ferrule holder (as shown in FIGS. 11-13) may simplify formation of a fusion splice joint between the integrated fiber-ferrule 72B and the stripped section 96 of the optical fiber 98. The stripped section 96 of the optical fiber exposes a cladding layer 92 of the optical fiber 98, as compared to the remainder of the optical fiber 98 bearing a polymeric coating 94 over the cladding layer 92.

Figure 15:
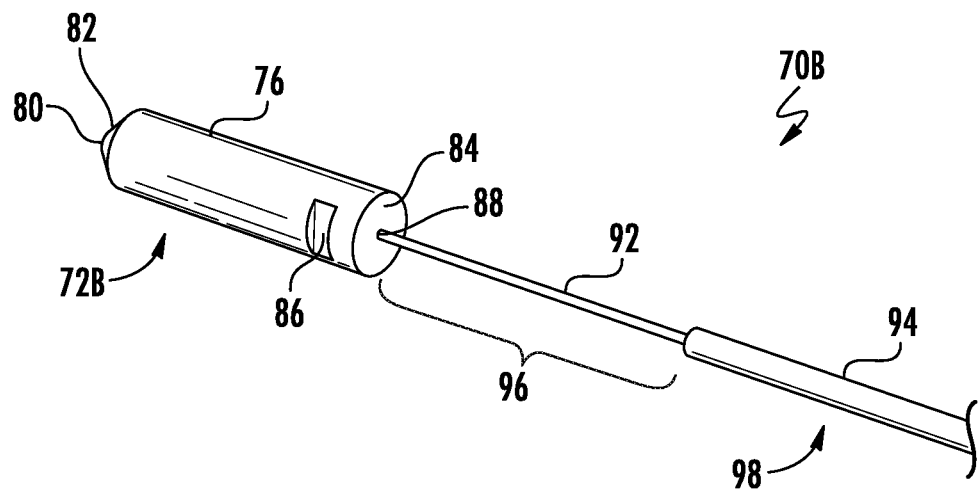
FIG. 15 is a perspective view of a fiber optic assembly including the integrated fiber-ferrule of FIG. 14 following fusion splicing of an end of the stripped section of optical fiber to the core of the integrated fiber-ferrule.

FIG. 15 illustrates a fiber optic assembly 70B including the integrated fiber-ferrule 72B of FIG. 14 following laser fusion splicing between the integrated fiber-ferrule 72B and the stripped section 96 of the optical fiber 98. Such fusion splicing forms a splice joint 88 along the rear end face 84, with respective cores (not shown) of the integrated fiber-ferrule 72B and the optical fiber 98 preferably being aligned with and fused to one another. Alignment of a core 90 of the optical fiber 98 and a core of the integrated fiber-ferrule 72B may be promoted by use of alignment techniques such as machine vision or active monitoring of optical power coupled through the splice joint 88 during fabrication of the splice joint 88. At the splice joint 88, the (smaller diameter) cladding layer 92 of the optical fiber 98 is also fused to the (larger diameter) cladding layer 76 of the integrated fiber-ferrule 72B.

Figure 16:
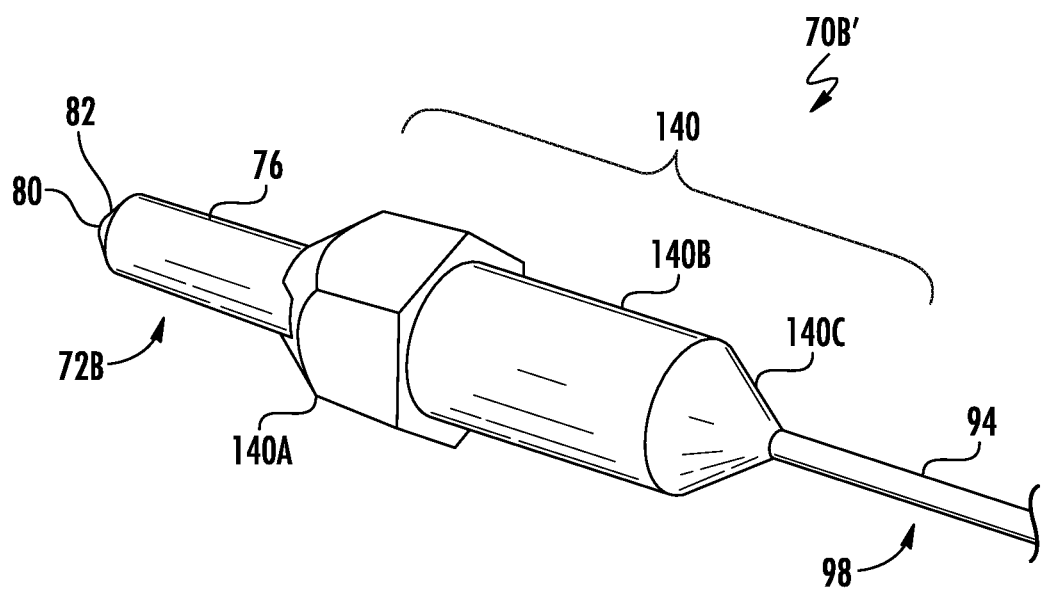
FIG. 16 is a perspective view of the fiber optic assembly of FIG. 15 following overmolding of a covering material embodying a combined ferrule holder and splice protector over a rear portion of the integrated fiber-ferrule, a fusion splice joint, and the stripped section of optical fiber.

FIG. 16 is a perspective view of a protected fiber optic assembly 70B' produced by overmolding a covering material 140, which embodies a combined ferrule holder/splice protector, over a rear portion of the integrated fiber-ferrule 72B and over the stripped section 96 of the optical fiber 98. The covering material 140 includes a ferrule holder portion 140A (which overlies the recess 86 defined in the cladding layer 76), a generally tubular intermediate portion 140B (which covers the fusion splice joint 88 and the formerly stripped section 96 of the optical fiber 98 (both as shown in FIG. 15)), and a terminal portion 140C (which tapers in diameter from the intermediate portion and covers a portion of the polymeric coating 94 of the optical fiber 98). In certain embodiments, the covering material 140 comprises a unitary (single piece) member encompassing the ferrule holder portion 140A, the intermediate portion 140B, and the terminal portion 140C. If desired, the covering material 140 may be overmolded by supplying molten thermoplastic material to a removable mold (not shown; optionally separable in two complementary halves or parts) surrounding a rear portion of the integrated fiber-ferrule 72B as well as the splice joint 88 and the formerly stripped section 92 (shown in FIG. 15) of the optical fiber 98. Thereafter, the thermoplastic material is allowed to cool and harden into a solid. Alternative molding materials may be used, such as light and/or heat curable adhesives, or other polymeric materials. The covering material 140 may serve multiple functions, such as: placing and maintaining the integrated fiber-ferrule 72B in a desired rotational position (using the ferrule holder portion 140A), preventing mechanical damage of the fusion splice joint, inhibiting small-radius bending of the optical fiber 98 proximate to the integrated fiber-ferrule 72, inhibiting intrusion of moisture/particulate material to the previously stripped section of the optical fiber 98, and generally protecting the light-carrying ability of the previously stripped section of the optical fiber 98.

Various figures depict optical fibers coupleable to integrated fiber-ferrules as being of indeterminate length. In certain embodiments, an optical fiber fusion bonded to an integrated fiber-ferrule may embody a short length of optical fiber (or "optical fiber stub") with low cutoff wavelength to yield a fiber-ferrule stub assembly. Such a fiber-ferrule stub assembly may be used for field mountable connectors based on mechanical splicing or fusion splicing of an existing optical fiber to the optical fiber stub.

FIGS. 17-20 embody plots of data obtained by Monte Carlo simulation to enable comparison of CTFE and insertion losses of conventional optical connectors (made by assembling optical fibers with ceramic ferrules) to CTFE and insertion losses of novel optical connectors incorporating integrated fiber-ferrules as disclosed herein. The Monte Carlo method uses repeated random sampling to generate simulated data to use with a mathematical model.

Figure 17:
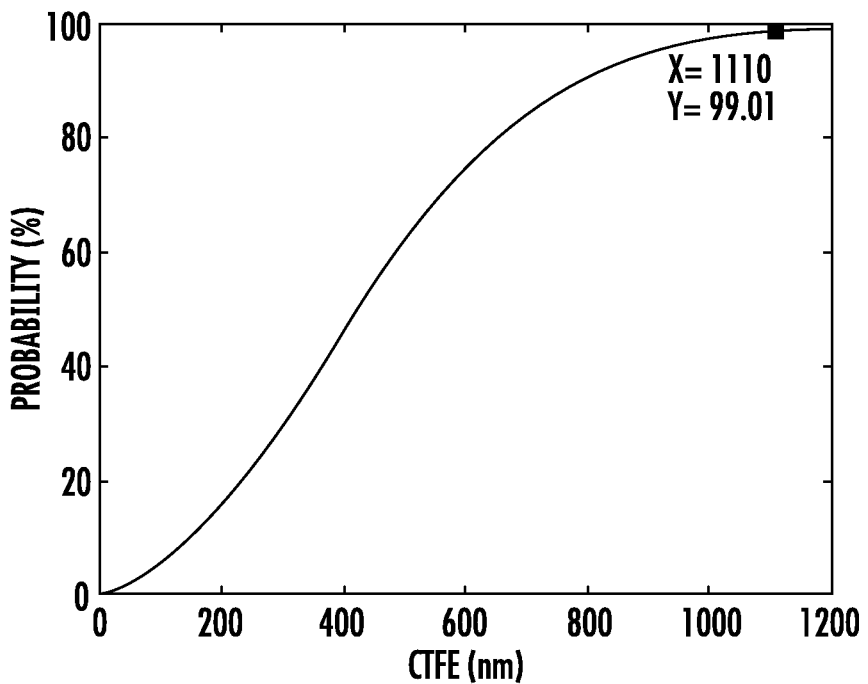
FIG. 17 is a plot of probability (%) versus core to ferrule eccentricity (nm) obtained by Monte Carlo simulation of conventional optical connectors made by terminating optical fibers with ceramic ferrules.
Figure 18:
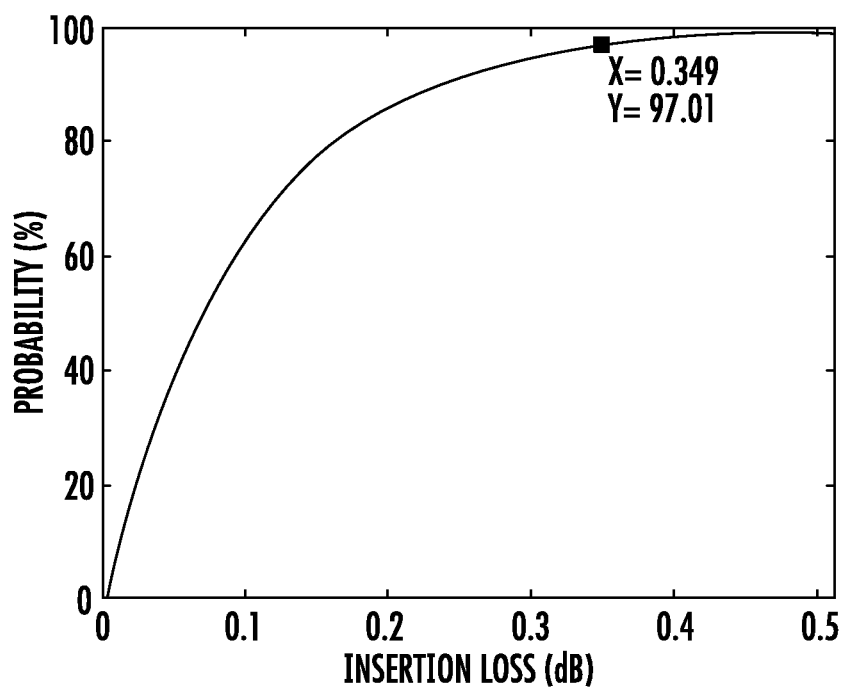
FIG. 18 is a plot of probability (%) versus insertion loss (dB) obtained by Monte Carlo simulation of randomly mated angled physical contact (APC) type conventional optical connectors made by terminating optical fibers with ceramic ferrules.
Figure 19:
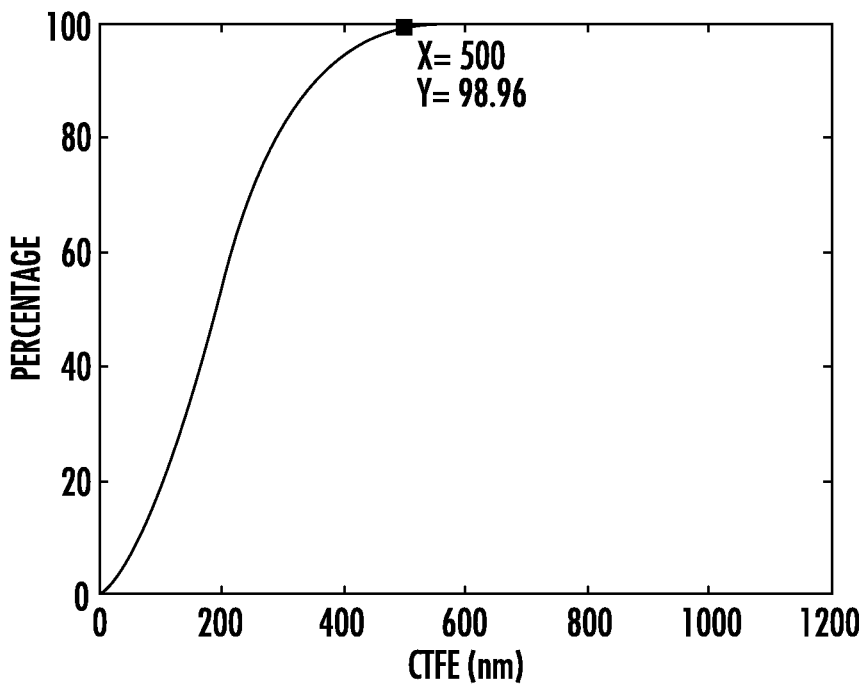
FIG. 19 is a plot of probability (%) versus core to ferrule eccentricity (nm) obtained by Monte Carlo simulation of an optical connector incorporating an integrated fiber-ferrule according to one embodiment, with core to ferrule eccentricity being directly determined by the drawing process used to fabricate the integrated fiber-ferrule.
Figure 20:
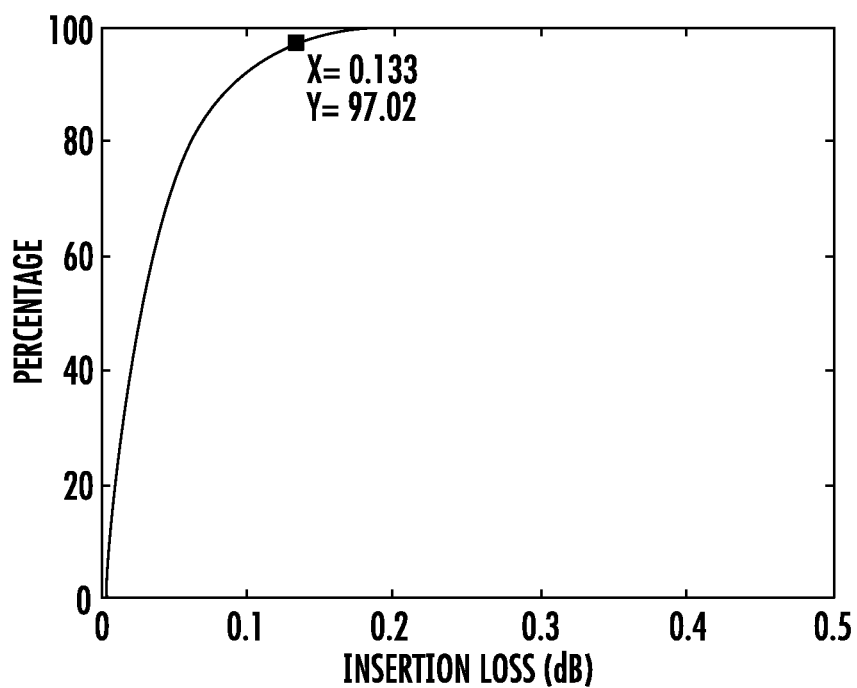
FIG. 20 is a plot of probability (%) versus insertion loss (dB) obtained by Monte Carlo simulation of randomly mated APC type optical connectors incorporating integrated fiber-ferrules according to one embodiment.

FIGS. 17 and 18 provide plots of data corresponding to conventional optical connectors. Specifically, FIG. 17 is a plot of probability (%) versus CTFE (nm) obtained by simulation of conventional optical connectors. FIG. 18 is a plot of probability (%) versus insertion loss (dB) obtained by simulation of randomly mated angled physical contact (APC) type conventional optical connectors. FIGS. 19 and 20 provide plots of data corresponding novel optical connectors incorporating integrated fiber-ferrules as disclosed herein. Specifically, FIG. 19 is a plot of probability (%) versus CTFE (nm) obtained by simulation of optical connectors incorporating integrated fiber-ferrules. FIG. 20 is a plot of probability (%) versus insertion loss (dB) obtained by simulation of randomly mated APC type optical connectors incorporating integrated fiber-ferrules as disclosed herein.

Comparing FIGS. 17 and 19, the CTFE value distribution is substantially lower and more uniform for simulation of the novel optical connectors incorporating integrated fiber-ferrules than for simulation of conventional optical connectors. In particular, about 99 percent of conventional optical connectors are expected to exhibit CTFE values of at or below 1110 nm. In contrast, about 99 percent of optical connectors incorporating integrated fiber-ferrules are expected to exhibit CTFE values of at or below 500. This represents a reduction of about 55% in peak values of the expected CTFE distribution.

Comparing FIGS. 18 and 20, the random mate insertion loss distribution is also substantially lower and more uniform for simulation of the novel optical connectors incorporating integrated fiber-ferrules than for simulation of conventional optical connectors. Specifically, about 97 percent of conventional optical connectors are expected to exhibit insertion losses of at or below 0.349 dB. By comparison, about 97 percent of optical connectors incorporating integrated fiber-ferrules are expected to exhibit insertion losses of at or below 0.133 dB. This represents a reduction of about 62% in peak values of the expected random mate insertion loss distribution.

With continued reference to FIG. 20 in comparison to the random mate attenuation thresholds specified in Table 1, the modeled loss performance for optical connectors incorporating integrated fiber-ferrules as disclosed herein exceeds that of Grade A (according to IEC standard 61300-3-34, Edition 3.0: 2009-01), with a margin to accommodate the additional splice loss (i.e., less than about 0.02 dB) due to fusion splicing within the integrated fiber-ferrule. Alternatively, if the fiber concentricity tolerance is to be relaxed, in certain embodiments, tuning of rotational position of integrated fiber-ferrule can be employed in a manner similar to that utilized with conventional zirconia ferrule based connectors in order to improve the insertion loss performance.

Use of integrated fiber-ferrules provides numerous potential benefits over conventional ferrule-fiber assemblies typically incorporating zirconia (ceramic) ferrules. Such benefits may be realized without sacrificing compatibility with an installed base of connectors, since integrated fiber-ferrule connectors disclosed herein are compatible for use with existing zirconia ferrule-based physical contact connectors.

As demonstrated previously, integrated fiber-ferrules exhibit lower CTFE than conventional fiber-ferrule assemblies, and optical connectors incorporating integrated fiber-ferrules exhibit lower insertion loss than optical connectors incorporating conventional fiber-ferrule assemblies.

Integrated fiber-ferrules with high precision may advantageously be produced at low cost. State of the art optical fiber manufacturing processes are capable of drawing more than 100 km of optical fiber continuously. This is equivalent to making 1 km of 1.25 mm diameter fiber-ferrule cane, which may be cut into over 140,000 pieces of LC ferrules (each with a length of about 6.4 mm after final shaping steps), given the size difference between a single strand of optical fiber and an integrated fiber-ferrule. The cost of a producing a single integrated fiber-ferrule is anticipated to be on the order of a few cents when implemented in a high throughput production process. The material cost requirements for producing integrated fiber ferrules are anticipated to be substantially lower than those for producing conventional ceramic ferrules. Furthermore, with on-draw process control of cladding diameter and concentricity, the quality of an integrated fiber-ferrule is assured—unlike the quality of ceramic ferrules, which require laborious post-processing and screening. Built on the massive scalability of optical fiber manufacturing, the integrated fiber-ferrules are anticipated to be mass-producible at volumes far exceeding those of ceramic ferrules.

When conventional zirconia (ceramic) ferrules are used, polishing and bonding processes are critical to obtain a correct amount of fiber height (protrusion or undercut) relative to the ferrule. In particular, the fiber end face protrusion or undercut is strongly dependent on the polishing process parameters, due to the different hardness of the materials (i.e., the ceramic ferrule versus the glass fiber). An integrated fiber-ferrule as disclosed herein and embodying all glass materials is free from this issue. As a result, end face finishing of an integrated fiber-ferrule as disclosed herein is substantially simpler than that of a ceramic ferrule. For example, in certain embodiments, an all-glass connector end face of an integrated fiber-ferrule can be finished completely by laser processing without requiring use of mechanical polishing.

Because all-glass integrated fiber-ferrules are transparent, CTFE values (or, more specifically, core to cladding layer eccentricity values) can be measured transversely in a non-invasive manner. This simplifies dimensional and quality control screening following the manufacture of integrated fiber-ferrules.

Detrimental fiber pistoning effects in conventional connectors due to thermal cycling are also eliminated through use of integrated fiber-ferrules as disclosed herein. That is, by avoiding the use of epoxy between a fiber and a ferrule, an integrated fiber-ferrule as disclosed herein is inherently free from any pistoning effect when exposed to variations in temperature. Moreover, due to the absence of epoxy, a connector including an integrated fiber-ferrule as disclosed herein may be suitable for use in harsh high-temperature environments. Optionally, a splice joint including an integrated fiber-ferrule may be protected by polyimide or another polymer material to further enhance resistance to high-temperature environments.

In certain embodiments, a fiber optic assembly as disclosed herein may include a fiber optic connector that includes an integrated fiber-ferrule as disclosed herein, a ferrule holder, and a connector housing in which the ferrule holder is retained. In such an embodiment, the integrated fiber-ferrule is at least partially received in the ferrule holder, and the ferrule holder is spring-biased toward a front end of the connector housing so that the integrated fiber-ferrule extends beyond the front end of the connector housing. The resulting fiber optic connector may resemble the connector 10 illustrated and described in conjunction with FIGS. 2 and 3, with an integrated fiber-ferrule as disclosed herein substituted for the ferrule 12.

Those skilled in the art will appreciate that other modifications and variations can be made without departing from the spirit or scope of the invention. For example, although the description above refers primarily to integrated fiber-ferrules having a core with a diameter substantially similar to conventional single mode fibers, in alternative embodiments, an integrated fiber-ferrule may include a core with a larger diameter, such as about 50 µm or about 62.5 µm to match conventional multi-mode fibers.

Since modifications, combinations, sub-combinations, and variations of the disclosed embodiments incorporating the spirit and substance of the invention may occur to persons skilled in the art, the invention should be construed to include everything within the scope of the appended claims and their equivalents. The claims as set forth below are incorporated into and constitute part of this detailed description.

It will also be apparent to those skilled in the art that unless otherwise expressly stated, it is in no way intended that any method in this disclosure be construed as requiring that its steps be performed in a specific order. Accordingly, where a method claim below does not actually recite an order to be followed by its steps or it is not otherwise specifically stated in the claims or descriptions that the steps are to be limited to a specific order, it is no way intended that any particular order be inferred. Moreover, where a method claim below does not explicitly recite a step mentioned in the description above, it should not be assumed that the step is required by the claim.

What is claimed is:

1. A fiber optic assembly comprising:
   an optical fiber comprising a first core and a first cladding layer, wherein the first cladding layer has a lower index of refraction than the first core;
   an integrated fiber-ferrule comprising a second core and a second cladding layer, wherein the second cladding layer has a lower index of refraction than the second core, and wherein the second cladding layer comprises an outer diameter at least five times larger than an outer diameter of the first cladding layer, wherein the integrated fiber-ferrule is formed by drawing a glass preform, wherein the glass preform comprises the second core and the second cladding layer peripherally surrounding the core; and
   a fusion splice joint joining a front end of the first core and a rear end of the second core.

2. The fiber optic assembly of claim 1, wherein the second core is arranged in direct contact with the second cladding layer without an adhesive arranged therebetween.

3. The fiber optic assembly of claim 1, wherein the outer diameter of the second cladding layer is at least 20 times greater than an outer diameter of the second core.

4. The fiber optic assembly of claim 1, wherein the outer diameter of the second cladding layer is at least 100 times greater than an outer diameter of the second core.

5. The fiber optic assembly of claim 1, wherein the outer diameter of the second cladding layer is at least about ten times larger than the outer diameter of the first cladding layer.

6. The fiber optic assembly of claim 1, wherein an outer diameter of the second core is substantially equal to an outer diameter of the first core.

7. The fiber optic assembly of claim 1, wherein the first core, the first cladding layer, the second core, and the second cladding layer comprise glass.

8. The fiber optic assembly of claim 7, wherein at least a portion of the second cladding layer is doped with a dopant comprising $TiO_2$.

9. The fiber optic assembly of claim 8, wherein $TiO_2$ is present in the at least a portion of the second cladding layer at a concentration greater than 5 wt %.

10. The fiber optic assembly of claim 1, wherein:
   the optical fiber comprises a pre-coated section and a stripped section, with the stripped section terminating at the front end of the first core; and
   the fiber optic assembly further comprises a covering material encasing the fusion splice joint, the stripped section, and a portion of the pre-coated section.

11. The fiber optic assembly of claim 10, further comprising a ferrule holder defining a central aperture, wherein:
   at least a portion of the integrated fiber-ferrule is arranged within the central aperture;
   a recess is defined in an end portion of the ferrule holder; and
   the covering material extends through at least a portion of the recess to contact a rear end face of the integrated fiber-ferrule.

12. The fiber optic assembly of claim 1, wherein:
   the optical fiber comprises a pre-coated section and a stripped section, with the stripped section terminating at the front end of the first core; and
   the fiber optic assembly further comprises a unitary ferrule holder/splice protector arranged over an end portion of the integrated fiber-ferrule, wherein the unitary ferrule holder/splice protector encases a portion of the integrated fiber-ferrule, the fusion splice joint, the stripped section, and a portion of the pre-coated section.

13. The fiber optic assembly of claim 1, wherein the outer diameter of the second cladding layer is either in a first range of 1.249±0.0005 mm, or in a second range of 2.499±0.0005 mm.

14. The fiber optic assembly of claim 1, further comprising a fiber optic connector that includes:
   the integrated fiber-ferrule;
   a ferrule holder in which the integrated fiber-ferrule is partially received; and
   a connector housing in which the ferrule holder is retained, wherein the ferrule holder is spring-biased toward a front end of the connector housing so that the integrated fiber-ferrule extends beyond the front end of the connector housing.

15. An optical coupling element configured as an integrated fiber-ferrule, the optical coupling element comprising:
   a core having a first index of refraction; and
   a cladding layer peripherally surrounding the core, wherein the cladding layer has a lower index of refraction than the core, and wherein the core is arranged in direct contact with the cladding layer without an adhesive arranged therebetween;
   wherein an outer diameter of the cladding layer is equal to or greater than 1 mm and is at least 20 times greater than an outer diameter of the core, and
   wherein the integrated fiber-ferrule is formed by drawing a glass preform, wherein the glass preform comprises the core and the cladding layer peripherally surrounding the core.

16. A method for fabricating an integrated fiber-ferrule, the method comprising:
   drawing a glass preform into a glass cane, wherein the glass preform comprises a core and a cladding layer peripherally surrounding the core, wherein the cladding layer has a lower index of refraction than the core, and wherein an outer diameter of the cladding layer is equal to or greater than 1 mm and is at least 20 times greater than an outer diameter of the core; and
   cutting at least a portion of the glass cane.

17. The method of claim 16, further comprising:
   shaping at least a portion of the cladding layer proximate to the end face to form an optical coupling element.

18. The method of claim 16, wherein the cutting of the at least a portion of the glass cane comprises defining a glass cane section substantially equal in length to a ferrule, and the shaping of the at least a portion of the cladding layer proximate to the end face is performed after the defining of the glass cane section.

19. The method of claim 16, further comprising:
provide a ferrule holder surrounding a portion of the cladding layer proximate to a rear end face distal from the end face;
laser fusion splicing an uncoated fiber core of an optical fiber to the core at the rear end face to form a fusion splice joint; and
encasing the fusion splice joint and the uncoated fiber core with a covering material.

20. The method of claim 16, wherein the cladding layer comprises a rear end face distal from the end face, the method further comprising:
defining a recess in or along a sidewall of the cladding layer;
laser fusion splicing an uncoated fiber core of an optical fiber to the core at the rear end face to form a fusion splice joint; and
over-molding a covering material assembly embodying a ferrule holder and a splice protector over the fusion splice joint, the uncoated fiber core, and a portion of the cladding layer proximate to the rear end face.

21. The method of claim 16, further comprising fabricating the glass preform, wherein fabricating of the glass preform comprises outside vapor deposition.

* * * * *